Nov. 18, 1947.    C. B. STADUM    2,431,284
PULSATION TIMING SYSTEM
Filed Nov. 20, 1943

WITNESSES:

INVENTOR
Clarence B. Stadum.
BY
ATTORNEY

Patented Nov. 18, 1947

2,431,284

UNITED STATES PATENT OFFICE 2,431,284

PULSATION TIMING SYSTEM

Clarence B. Stadum, Edgewood, Pa., assignor to Westinghouse Electric Corporation, East Pittsburgh, Pa., a corporation of Pennsylvania Application November 20, 1943, Serial No. 511,177

14 Claims. (Cl. 250—27)

This invention relates to an electronic control system and has particular relation to an electronic system for pulsation timing.

In resistance spot welding uniform welds of good quality may be obtained by a method which is known as pulsation welding. In accordance with this method, current is supplied from an alternating current source to the welding transformer through a pair of inversely connected ignitrons. Control circuits are provided to control the firing of the ignitrons so that a number of discrete impulses of welding current is provided to produce each weld. Each impulse is of a predetermined length and there is a predetermined time interval between impulses, the length of each impulse and the interval between successive impulses being measured in terms of half-periods of the source.

A number of different timing systems have been devised in the past to control the operation of the ignitrons. Many of these systems are rather elaborate and involve the use of numerous discharge devices and their associated circuits. However, such systems, while operating satisfactorily, are comparatively expensive and therefore unsatisfactory for many commercial applications.

It is accordingly, an object of my invention to provide a new and simplified electronic timing system for a pulsation welder.

A more general object of my invention is to provide a novel system for supplying power from an alternating current source to a load in discrete impulses, each impulse being of a predetermined length with a predetermined time interval between successive impulses.

More specifically, it is an object of my invention to provide an improved pulsation timing system which is simple, rugged and inexpensive in construction and accurate in operation.

In accordance with my invention a timing system is provided which comprises an electric discharge valve of the arc-like type connected in circuit with the alternating potential source. The valve, preferably a thyratron, is adapted to be rendered conductive in a positive half-period of the source when a potential more positive than a predetermined critical potential is impressed between its grid and cathode. Circuit means, including a normally discharged capacitor, are provided which connect the grid and cathode and tend to render the valve conductive at a predetermined instant in a positive half-period whereby the valve conducts a current of an effective value greater than a predetermined value. Current responsive means, such as a relay, is connected in circuit with the valve and is effective in response to a current of an effective value greater than said predetermined value to connect an auxiliary source of alternating potential in circuit with said capacitor and the grid and cathode of the valve.

The alternating potential provided by the auxiliary source is of the same frequency but displaced in phase relative to the main source. Upon the connection of the auxiliary source in circuit with the capacitor, the latter is charged by the grid current of the valve so that an alternating potential superimposed on a potential, which gradually becomes more and more negative, is impressed between the grid and cathode of the valve. As a result, the valve becomes conductive at an instant gradually later in successive positive half-periods of the main source until the effective value of the valve current becomes less than the predetermined value. The current responsive means is then effective to disconnect the auxiliary source from the capacitor and to connect a discharge circuit across the capacitor. The charge on the capacitor is such as to maintain the valve non-conductive. After a predetermined number of half-periods of the main source, the capacitor is discharged and the valve is again rendered conductive.

Means are also provided to independently adjust both the rate of charge of the capacitor and the rate of discharge of the capacitor. In this manner the length of the conductive and nonconductive intervals of the valve may be preselected. Current thus passes through the valve in timed pulsations and the ignitrons in a welding circuit may then be controlled in accordance with the current through the valve.

The novel features which I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
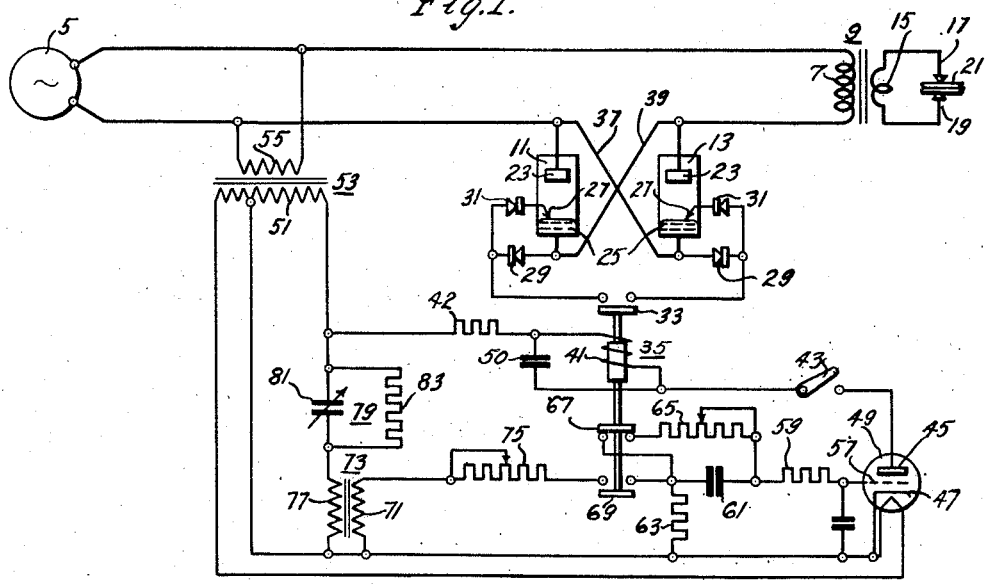
Figure 1 is a schematic diagram of an embodiment of my invention.

As shown in Fig. 1, a source of alternating current 5 is connected to the primary 7 of a welding transformer 9 through a pair of inversely connected ignitrons 11 and 13. The secondary 15 of the transformer 9 is connected across welding electrodes 17 and 19 which engage the material 21 to be welded.

Each of the ignitrons 11 and 13 includes an anode 23, a cathode 25 and an ignition electrode 27. The cathode 25 of each ignitron is connected to the corresponding ignition electrode 27 through a pair of series connected rectifiers 29 and 31. The junction points of the two pairs of rectifiers 29 and 31 are interconnected through the normally opened contactor 33 of a relay 35.

The ignition circuit of one of the ignitrons 11 may then be traced from the source 5 through a conductor 37, rectifier 29 associated with ignitron 13, contactor 33 of relay 35, rectifier 31 associated with ignitron 11, the ignition electrode 27 and cathode 25 of ignitron 11, conductor 39 and secondary 7 of the transformer to the source. It is to be noted that the direction of the rectifiers in the ignition circuit for ignitron 11 is such that ignition current is supplied only in the half-period of the source 5 in which the anode 23 of the ignitron 11 is positive.

The ignition circuit of the other ignitron 13 is somewhat similar and may be traced from the source 5 through the secondary 7, conductor 39, rectifier 29 associated with ignitron 11, contactor 33, rectifier 31 associated with ignitron 13, the ignition electrode 27 and cathode 25 of ignitron 13 and conductor 37 to the source. The direction of current flow through the rectifiers in the ignition circuit of ignitron 13 is such that current flows only when the anode 23 of the ignitron 13 is positive.

From the foregoing description it is apparent that current is to be supplied to the welding transformer 9 in each half-period of the source 5 as long as the contactor 33 is closed, the ignitrons 11 and 13 being conductive alternately in successive half-periods. Conversely, no current is supplied to the welding transformer during the period that contactor 33 is open.

The coil 41 of relay 35 is connected in series with a resistor 42, a switch 43, and the anode 45 and cathode 47 of an electric discharge valve 49 across a secondary 51 of an auxiliary transformer 53. The valve 49 is of the arc-like type, preferably a thyratron, and is adapted to become conductive while its anode is positive when its grid 57 is at a potential equal to or more positive than a predetermined critical value with respect to the cathode 47. In the usual thyratron the critical value is approximately −6 volts.

The primary 55 of transformer 53 is energized from the source 5. The grid 57 of the valve 49 is connected to the cathode 47 through a grid resistor 59, a capacitor 61, and a resistor 63. A discharge circuit consisting of a potentiometer 65 and normally closed contactor 67 of relay 35 is connected across the capacitor 61. As the capacitor 61 is thus normally discharged, the grid 57 of valve 49 is normally at the same potential as the cathode 47 or more positive than the predetermined critical value. Consequently, when switch 43 is closed, the valve 49 conducts current throughout a positive half-period of the source, that is, in a half-period in which the anode 45 is positive with respect to the cathode 47.

Current flowing through the valve 49 energizes relay 35 to close the contactor 33 and initiate the supply of current to the welding transformer through ignitrons 11 and 13. A capacitor 50 may be connected in parallel with the coil 41 to maintain it energized between successive positive half-periods. Energization of the relay 35 also causes the contactor 67 to be opened to break the discharge circuit of the capacitor 61. Another contactor 69 of the relay 35 is closed upon energization of the relay and connects the secondary 71 of another auxiliary transformer 73 across the resistor 63 through a second potentiometer 75. The primary 77 of the auxiliary transformer 73 is also energized from the secondary 51 of transformer 53 through a phase shifting circuit 79 comprising a variable capacitor 81 and a resistor 83 in parallel therewith.

An alternating potential of the same frequency as the potential of source 5 but displaced in phase relative thereto, thus appears across the secondary 71 of transformer 73. The amount of phase displacement is determined by the setting of capacitor 81 and is preferably 60° to 90° lagging with respect to the source. The amount of phase displacement to be actually used depends upon the value of the current necessary to maintain the relay 35 energized as becomes apparent hereinafter. The alternating potential appearing across secondary 71 causes current to flow in a circuit extending from the secondary 71 through potentiometer 75, contactor 69, capacitor 61, grid resistor 59, the grid 57 and cathode 47 of the valve 49 to the secondary 71. Because of the rectifying properties of the grid-cathode circuit, the capacitor 61 is thus gradually charged at a rate dependent upon the setting of potentiometer 75. The charge on the capacitor 61 tends to maintain grid 57 more negative than the critical value necessary to render the valve 49 conductive. However, the alternating potential across the secondary 71 is added to the charge on capacitor 61 to produce a resultant grid potential which becomes more positive than the predetermined critical value. The instant at which the resultant potential rises above the predetermined critical value is gradually later in successive positive half-periods of the source because of the increasing charge on the capacitor 61 and the sloping wave front of the alternating potential.

The coil 41 of relay 35 and the capacitor 50 in parallel therewith form a current responsive means such that the relay remains in its energized position so long as the effective value of the current through the valve 49 is above a predetermined value. As the valve 49 is rendered conductive gradually later in successive positive half-periods, the effective value of the current gradually decreases and eventually becomes too small to maintain the relay energized. The time during which the relay remains energized thus depends upon the charging rate of the capacitor 61 which in turn depends upon the setting of potentiometer 75. It is to be understood that with certain relays having a long holding period a parallel capacitor 50 need not be used.

When the relay 35 is deenergized, contactor 33 opens the ignition circuits of the ignitrons 11 and 13 to halt the flow of welding current. Contactor 69 of the relay also disconnects the secondary 71 from the capacitor 61, whereupon the charge on the capacitor 61 is sufficient to maintain the valve 49 non-conductive.

Contactor 67 of relay 35 is reclosed when the relay is deenergized to again complete the discharge circuit across the capacitor 61. The capacitor then discharges at a rate determined by the setting of potentiometer 65. After a definite time interval the capacitor is discharged sufficiently to permit valve 49 to again be rendered conductive and the cycle of operation is repeated.

Figure 2:
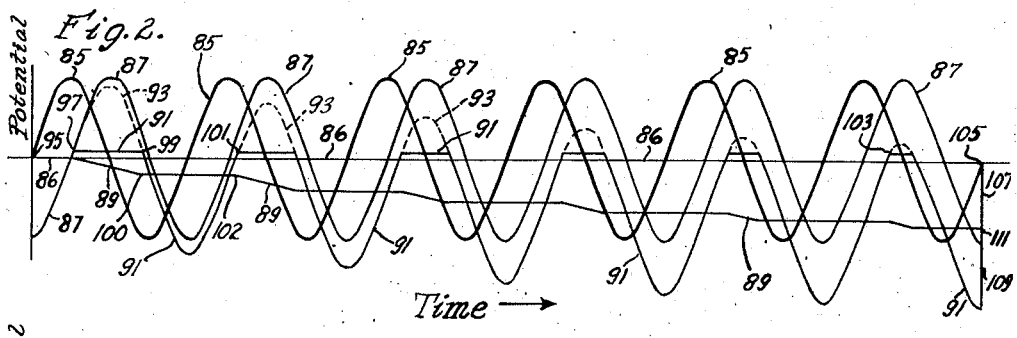
Figs. 2 and 3 are curves illustrating the operation of the apparatus shown in Fig. 1.
Figure 3:
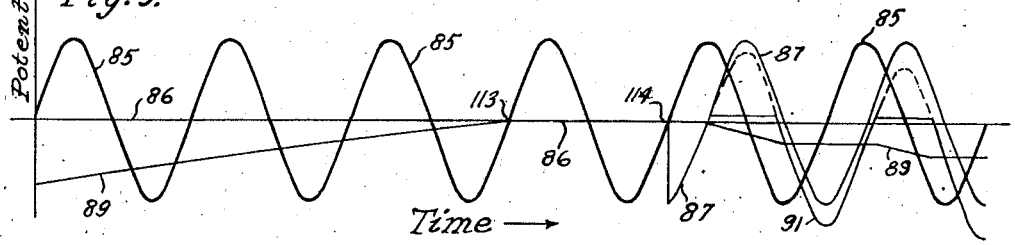

The operation of the apparatus shown in Fig. 1 may be better understood by referring to Figs. 2 and 3. In these figures the alternating potential supplied by the secondary 51 across the anode and cathode of valve 49 is illustrated by curve 85. For purposes of simplification in illustration, it is assumed in the curves of Figs. 2 and 3 that the predetermined critical value of the grid-cathode potential necessary to render valve 49 conductive follows along the zero or base line 86. The alternating potential appearing across the secondary 71 is illustrated by curve 87. Curve 89 represents the voltage across capacitor 61 and curve 91 represents the resultant potential impressed across the grid and cathode of the valve 49. It is to be noted that the curve 91 has a flat top on the positive pulses because of the current flow through the grid-cathode circuit. The dotted curves 93 illustrate the position of the resultant potential if current did not flow through the grid-cathode circuit.

Referring specifically to Fig. 2 with reference to Fig. 1, when the switch 43 is closed, the valve 49 immediately becomes conductive and, after a fixed time delay depending upon the relay employed, the relay 35 is energized at point 95 on curve 85 so that contactor 33 completes the ignition circuits of the ignitrons 11 and 13. Upon energization of relay 35, contactor 69 connects the secondary 71 in circuit with capacitor 61 to supply the potential represented by curve 87. When curve 87 rises slightly above the base line 86 at point 97 current starts to flow through the grid-cathode circuit of valve 49. As a result, capacitor 61 is charged negatively as illustrated by curve 89, the slope of the curve at this point being dependent upon the setting of potentiometer 75. Adding the potential 89 and the potential 87 during the period of capacitor charge produces curve 93. However, the resultant grid-cathode potential does not follow curve 93 but instead is represented by curve 91 which has a flat top because of the grid-cathode current flow.

When the curve 91 drops below the value necessary to maintain a grid-cathode current as at point 99 charging of the capacitor 61 is momentarily halted. The capacitor does not lose this charge because the discharge circuit through potentiometer 65 is now open and the grid-cathode circuit serves as a rectifier. Consequently, the curve 89 slopes downwardly to point 100, which corresponds in time to point 99 on curve 91, and then follows a horizontal course from the point 100 to point 102 when the resultant potential rises slightly above the base line 87 at point 101 on curve 91 to start the grid-cathode current. Capacitor 61 is again supplied with a charging current and the potential thereacross becomes even more negative until charging of the capacitor is halted when the resultant potential again passes below the value necessary to maintain grid-cathode current. Thus it is apparent that the capacitor 61 receives an additional negative charge at a selected rate in each half-period of the alternating potential appearing across the secondary 71 with the capacitor charge remaining constant between charging intervals. Consequently, the resultant potential curve 91 is gradually lowered so that the valve 49 is rendered conductive at an instant gradually later in successive positive half-periods of the potential curve 85. After a predetermined time interval dependent upon the charging rate of the capacitor 61, the valve 49 is rendered conductive so late in a half-period, as at point 103, that the relay 35 does not remain energized and drops out at point 105.

When the relay 35 drops out the alternating component 87 of the resultant potential returns along line 107 to zero and the resultant potential curve 91 returns along line 109 to point 111 on curve 89. At the same time, contactor 33 opens the ignition circuits of the ignitrons 11 and 13.

Referring now to Fig. 3, when the relay 35 is deenergized, the capacitor 61 begins to discharge through potentiometer 65 so that curve 89 approaches the base line 86 at a rate determined by the setting of potentiometer 65. When the curve 89 reaches the base line as at point 113, the valve 49 again becomes conductive to energize relay 35 at point 114. The alternating component 87 is again made part of the resultant potential and the system repeats the operation described with reference to Fig. 2. It is thus apparent that contactor 33 completes the ignition circuits of the ignitrons for a time interval determined by the setting of potentiometer 75 and opens the ignition circuits for a time interval determined by the setting of potentiometer 65.

Although I have shown and described a specific embodiment of my invention, I am aware that many modifications thereof are possible without departing from the spirit of the invention. My invention therefore is not intended to be restricted to the specific embodiments shown and described.

I claim as my invention:

1. A timing system for use with a source of alternating current, comprising a load circuit connected to said source and including an electric discharge valve of the arc-like type for controlling the flow of current through said circuit, control means adapted to render said valve conductive at a predetermined instant in a positive half-period of said source potential whereby current of an effective value greater than a predetermined value flows in said circuit, means responsive to current in said circuit and operable in cooperation with said control means while said effective value is greater than said predetermined value to cause said valve to be rendered conductive gradually later in successive positive half-periods, said current responsive means being effective during operation thereof to condition said control means to prevent said valve from being rendered conductive after said effective value is less than said predetermined value, and means connected with said current responsive means for reconditioning said control means to render said valve conductive at said predetermined instant in a positive half-period a preselected time after said effective value becomes less than said predetermined value.

2. A timing system for use with a source of alternating potential, comprising a load circuit connected to said source, an electric discharge valve of the arc-like type connected in said load circuit, control means for said valve adapted to render said valve conductive when a potential more positive than a predetermined critical potential is impressed on said control means in a positive half-period of said source potential, and means including means responsive to current flow in said load circuit for impressing an alternating potential superimposed on a potential which gradually becomes more and more negative on said control means while the effective value of said load circuit current is above a predetermined value and impressing a potential which gradually becomes more and more positive on said control means while the effective value of said load circuit current is below said predetermined value.

3. A timing system for use with a source of alternating potential, comprising a load circuit connected to said source, an electric discharge valve of the arc-like type connected in said load circuit, control means for said valve adapted to render said valve conductive when a potential more positive than a predetermined critical potential is impressed on said control means in a positive half-period of said source potential, and means including means responsive to current flow in said load circuit for impressing an alternating potential displaced in phase relative to said source superimposed on a potential which gradually becomes more and more negative at a preselected rate on said control means while the effective value of said load circuit current is above a predetermined value and impressing a potential which gradually becomes more and more positive at a second preselected rate on said control means while the effective value of said load circuit current is below said predetermined value.

4. A timing system for use with a source of first alternating potential, comprising a load circuit connected to said source, an electric discharge valve of the arc-like type connected in said load circuit, control means for said valve adapted to render said valve conductive when a potential more positive than a predetermined critical potential is impressed on said control means in a positive half-period of said source potential, and means responsive to current flow in said load circuit and operable while the effective value of said load circuit current is above a predetermined value to impress on said control circuit a second alternating potential superimposed on a third potential which gradually becomes more and more negative starting at a first predetermined point at which the resultant impressed potential becomes more positive than said critical potential in a positive half-period of said source potential, said last-named means being operable while the effective value of said load circuit current is below said predetermined value to impress on said control means a fourth potential which gradually becomes more and more positive starting at a second predetermined point more negative than said critical potential.

5. A timing system for use with a source of first alternating potential, comprising a load circuit connected to said source, an electric discharge valve of the arc-like type connected in said load circuit, control means for said valve adapted to render said valve conductive when a potential more positive than a predetermined critical potential is impressed on said control means in a positive half-period of said source potential, and means responsive to current flow in said load circuit and operable while the effective value of said load circuit current is above a predetermined value to impress on said control circuit a second alternating potential superimposed on a third potential which gradually becomes more and more negative starting at a first predetermined point at which the resultant impressed potential becomes more positive than said critical value in a positive half-period of said source potential, said last-named means being operable while the effective value of said load circuit current is below said predetermined value to impress on said control means a fourth potential which gradually becomes more and more positive starting at a second predetermined point more negative than said critical value, first adjustable means for selecting the rate at which said third potential becomes more negative, and second adjustable means independent of said first adjustable means for selecting the rate at which said fourth potential becomes more positive.

6. A timing system for use with a main source of periodically pulsating potential, comprising a load circuit connected to said source, an electric discharge valve of the arc-like type having a pair of principal electrodes connected in said load circuit and a control electrode, a control circuit including an initially discharged capacitor connected between said control electrode and one of said principal electrodes, means adapted to function as an auxiliary source of periodically pulsating potential of the same periodicity but displaced in phase relative to said main source and having a sloping wave front, means responsive to current flow in said load circuit for connecting said auxiliary source in circuit with said capacitor, control electrode and one principal electrode while the effective value of said current is greater than a predetermined value, and a discharge circuit for said capacitor, said current responsive means being effective to disconnect said auxiliary source and connect said discharge circuit across said capacitor when said effective value is less than said predetermined value.

7. A timing system for use with a main source of alternating potential, comprising a load circuit connected to said source, an electric discharge valve of the arc-like type having an anode and a cathode connected in said load circuit and a grid, said valve being adapted to be rendered conductive in a positive half-period of said main source potential when said grid is more positive than a predetermined critical potential with respect to said cathode, circuit means connecting said grid and cathode tending to maintain said grid more positive than said critical potential and including a normally discharged capacitor, means adapted to function as an auxiliary source of alternating potential of the same frequency but displaced in phase relative to said main source, a relay in said load circuit continuously energizable only by a current of an effective value greater than a predetermined value to connect said auxiliary source in circuit with said capacitor, grid and cathode whereby said capacitor is gradually charged tending to make said grid more negative than said critical potential, the resultant grid to cathode potential becoming more positive than said critical potential gradually later in successive positive half-periods of the main source potential until the effective value of the load circuit current becomes less than said predetermined value, and a discharge circuit for said capacitor, said relay being effective when deenergized to connect said discharge circuit across said capacitor.

8. A timing system for use with a main source of alternating potential, comprising a load circuit connected to said source, an electric discharge valve of the arc-like type having an anode and a cathode connected in said load circuit and a grid, said valve being adapted to be rendered conductive in a positive half-period of said main source potential when said grid is more positive than a predetermined critical potential with respect to said cathode, circuit means connecting said grid and cathode tending to maintain said grid more positive than said critical potential and including a normally discharged capacitor, means adapted to function as an auxiliary source of alternating potential of the same frequency but displaced in phase relative to said main source, a relay in said load circuit continuously energizable only by a current of an effective value greater than a predetermined value to connect said auxiliary source in circuit with said capacitor, grid and cathode whereby said capacitor is gradually charged tending to make said grid more negative than said critical potential, the resultant grid to cathode potential becoming more positive than said critical potential gradually later in successive positive half-periods of the main source potential until the effective value of the load circuit current becomes less than said predetermined value, means in circuit with said auxiliary source and capacitor for selecting the charging rate of said capacitor, and a discharge circuit for said capacitor including means for selecting the discharging rate of said capacitor independently of the charging rate, said relay being effective when deenergized to connect said discharge circuit across said capacitor.

9. In a timing system for use with a source of periodically pulsating potential connected to supply current to a load, an electric valve having an anode and a cathode in circuit with said load for controlling the flow of current thereto from said source, said valve also having a control grid, a control circuit including an initially discharged capacitor connected between said grid and cathode to cause said valve to conduct a load current having an effective value greater than a predetermined value, and means for impressing a periodically pulsating potential with a sloping wave front in circuit with said capacitor, grid and cathode of a phase displaced relative to said source potential but tending to cause the grid to be positive with respect to the cathode in each pulsation of the source potential in which the anode is positive, said impressed potential causing a grid current to flow to charge said capacitor at a predetermined rate such that the effective value of said load current is reduced below said predetermined value after a predetermined time.

10. In a timing system for use with a source of alternating potential, an electric discharge valve of the arc-like type having a pair of principal electrodes in circuit with said source and a control electrode, a control circuit including an initially discharged capacitor connected between said control electrode and one of said principal electrodes to cause said valve to conduct current having an effective value greater than a predetermined value, and means responsive to the current conducted through said valve for impressing an alternating potential of the same frequency but displaced in phase relative to said source potential in circuit with said capacitor, control electrode and one principal electrode only while the effective value of said current is above a predetermined value whereby said capacitor is charged at a predetermined rate to reduce the effective value of said current to less than said predetermined value in a predetermined time.

11. A timing system for use with a source of alternating potential, comprising a load circuit connected to said source, an electric discharge valve of the arc-like type having a plurality of principal electrodes connected in said load circuit and a control electrode, a control circuit including an initially discharged capacitor connected between said control electrode and one of said principal electrodes to cause said valve to conduct current having an effective value greater than a predetermined value, means responsive to current flow in said load circuit for impressing an alternating potential in circuit with said capacitor and said control electrode and one principal electrode while the effective value of said current is greater than said predetermined value, and a discharge circuit for said capacitor, said current responsive means being effective to discontinue the impressing of said alternating potential and connect said discharge circuit across said capacitor when the effective value of said current is less than said predetermined value.

12. A timing system for use with a source of potential, comprising a load circuit connected to said source and including an electric valve for controlling the flow of current through said circuit, control means normally conditioned to cause said valve to conduct current having an effective value greater than a predetermined value, current responsive means in said circuit, an auxiliary control circuit connected by said current responsive means to said control means only while said effective value is greater than said predetermined value for causing said control means to reduce the current through said valve to an effective value less than said predetermined value a preselected time after said auxiliary circuit is first connected to said control means, and means operable by said current responsive means for reconditioning said control means to cause said valve to conduct current of an effective value greater than said predetermined value a preselected time after said effective value becomes less than said predetermined value.

13. A timing system for use with a source of potential, comprising a load circuit connected to said source, an electric valve having an anode and cathode in said load circuit and also having a control grid, a control circuit including a normally discharged capacitor connected between said grid and cathode to cause said valve to conduct current having an effective value greater than a predetermined value, means responsive to current flow in said load circuit for impressing an auxiliary potential in circuit with said capacitor, grid and cathode to charge said capacitor at a preselected rate and thereby reduce the effective value of said current to less than said predetermined value in a first predetermined time, and a discharge circuit for said capacitor including means for determining the rate of discharge, said current responsive means being effective to discontinue the impressing of said auxiliary potential and connect said discharge circuit across said capacitor when the effective value of said current is less than said predetermined value to increase said effective value to greater than said predetermined value in a second predetermined time.

14. A timing system for use with a source of periodically pulsating potential, comprising a load circuit connected to said source, an electric discharge valve of the arc-like type having an anode and a cathode connected in said load circuit and also having a control electrode, a control circuit including an initially discharged capacitor connected between said control electrode and cathode to cause said valve to conduct current having an effective value greater than a predetermined value, means responsive to current flow in said load circuit and operable while said effective value is greater than said predetermined value for impressing an auxiliary potential in circuit with said capacitor, control electrode and cathode to effect a gradual charging of the capacitor and thereby a reduction in the effective value of said current to less than said predetermined value in a predetermined time, and a discharge circuit for said capacitor, said current responsive means being effective to discontinue the impressing of said auxiliary potential and connect said discharge circuit across said capacitor when the effective value of said current is less than said predetermined value.

CLARENCE B. STADUM.

REFERENCES CITED

The following references are of record in the file of this patent:

UNITED STATES PATENTS

| Number | Name | Date |
|---|---|---|
| 1,867,225 | LeVan et al. | July 12, 1932 |
| 1,892,017 | Stansbury et al. | Dec. 27, 1932 |
| 2,171,347 | Schneider | Aug. 29, 1939 |
| 2,243,071 | Crago | May 27, 1941 |
| 2,269,151 | Garman | Jan. 6, 1942 |
| 2,195,996 | Palmer | Apr. 2, 1940 |
| 2,296,580 | Smiley | Sept. 22, 1942 |
| 2,306,237 | Wolfner, 2d | Dec. 22, 1942 |
| 2,314,691 | Dawson et al. | Mar. 23, 1943 |
| 2,337,905 | Livingston | Dec. 28, 1943 |
| 2,061,011 | Vingerhoets | Nov. 17, 1936 |